United States Patent
Ho et al.

(10) Patent No.: US 9,124,427 B2
(45) Date of Patent: Sep. 1, 2015

(54) CONTROL METHOD OF AN ANTENNA SYSTEM

(71) Applicant: Wistron NeWeb Corp., Hsinchu County (TW)

(72) Inventors: Yung-Fa Ho, Hsinchu County (TW); Ching-Po Chiu, Hsinchu County (TW); Chia-Wei Lin, Hsinchu County (TW)

(73) Assignee: WISTRON NEWEB CORP., Hsinchu County (TW)

( * ) Notice: Subject to any disclaimer, the term of this patent is extended or adjusted under 35 U.S.C. 154(b) by 197 days.

(21) Appl. No.: 13/904,279

(22) Filed: May 29, 2013

(65) Prior Publication Data

US 2014/0119294 A1    May 1, 2014

(30) Foreign Application Priority Data

Nov. 1, 2012 (TW) .............................. 101140519 A

(51) Int. Cl.
*H04W 28/10* (2009.01)
*H04L 12/841* (2013.01)
*H04L 12/855* (2013.01)
*H04L 1/18* (2006.01)

(52) U.S. Cl.
CPC ............ *H04L 1/1883* (2013.01); *H04L 47/283* (2013.01); *H04W 28/10* (2013.01)

(58) Field of Classification Search
None
See application file for complete search history.

(56) References Cited

U.S. PATENT DOCUMENTS

| | | | |
|---|---|---|---|
| 6,223,045 B1* | 4/2001 | Valentine et al. ............. | 455/466 |
| 2008/0192674 A1 | 8/2008 | Wang et al. | |
| 2008/0267141 A1* | 10/2008 | Ren et al. ...................... | 370/337 |
| 2011/0243002 A1* | 10/2011 | Tsuruoka ...................... | 370/252 |
| 2012/0052893 A1* | 3/2012 | Ando et al. ................... | 455/507 |

FOREIGN PATENT DOCUMENTS

TW    201246993 A1    11/2012

OTHER PUBLICATIONS

IEEE Standard for Information technology—Telecommunications and information exchange between systems—Local and mtropolitan area networks—Specific Requirments, Part 11: Wireless LAN Medium Access Control (MAC) and Physical Layer (PHY) Specifications, IEEE Std 802.11n, 2009.

* cited by examiner

*Primary Examiner* — Omar Ghowrwal
(74) *Attorney, Agent, or Firm* — Steptoe & Johnson LLP

(57) ABSTRACT

A control method of an antenna system includes the steps of configuring the antenna system to communicate with a plurality of stations, and configuring the antenna system to modify, at intervals of a predetermined time, a plurality of data acknowledgement (ACK) timeouts which correspond respectively to the stations, so that each of the data ACK timeouts substantially equals the round trip time of a packet for communication between the antenna system and the corresponding one of the stations.

18 Claims, 4 Drawing Sheets

US 9,124,427 B2

CONTROL METHOD OF AN ANTENNA SYSTEM

CROSS REFERENCE TO RELATED APPLICATION

This application claims priority of Taiwanese patent application no. 101140519 filed on Nov. 1, 2012.

BACKGROUND OF THE INVENTION

1. Field of the Invention

The invention relates to a control method of an antenna system, more particularly to a control method of an antenna system that is applicable to an access point (AP).

2. Description of the Related Art

As more and more mobile communication devices (such as smart phones, tablet PCs, notebook computers, etc.) provide a functionality of network connection, the demand for wireless network connection is increased significantly, so that the development of wireless network technology becomes more important. In a conventional wireless network, an access point (AP) usually serves as a connection point for a station (STA, such as a mobile communication device) to allow the station to connect to a wired network.

A conventional antenna system that is applicable to an access point usually adopts Multiple Input Multiple Output (MIMO) technology for signal transmission. However, the conventional antenna system may not quickly and dynamically maintain parameter settings thereof, as well as the quality of the signal transmission, in real-time, such that communication between the conventional antenna system and a station may occur under optimal settings, and that the signal transmission is subject to environmental noise interference. Hence, how to develop a novel control method of an antenna system with improved automatic maintenance capability is to be the focus of the present invention.

SUMMARY OF THE INVENTION

Therefore, an object of the present invention is to provide a control method of an antenna system which has better automatic maintenance capability.

Accordingly, the control method of an antenna system according to the preset invention comprises the steps of (A) configuring an antenna system to communicate with a plurality of stations, and (B) configuring the antenna system to modify, at intervals of a predetermined time, a plurality of data acknowledgement (ACK) timeouts which correspond respectively to the stations, so that each of the data ACK timeouts substantially equals the round trip time of a packet for communication between the antenna system and the corresponding one of the stations.

An effect of the present invention resides in that, by maintaining periodically the data ACK timeouts, the automatic maintenance capability of the antenna system may be improved.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
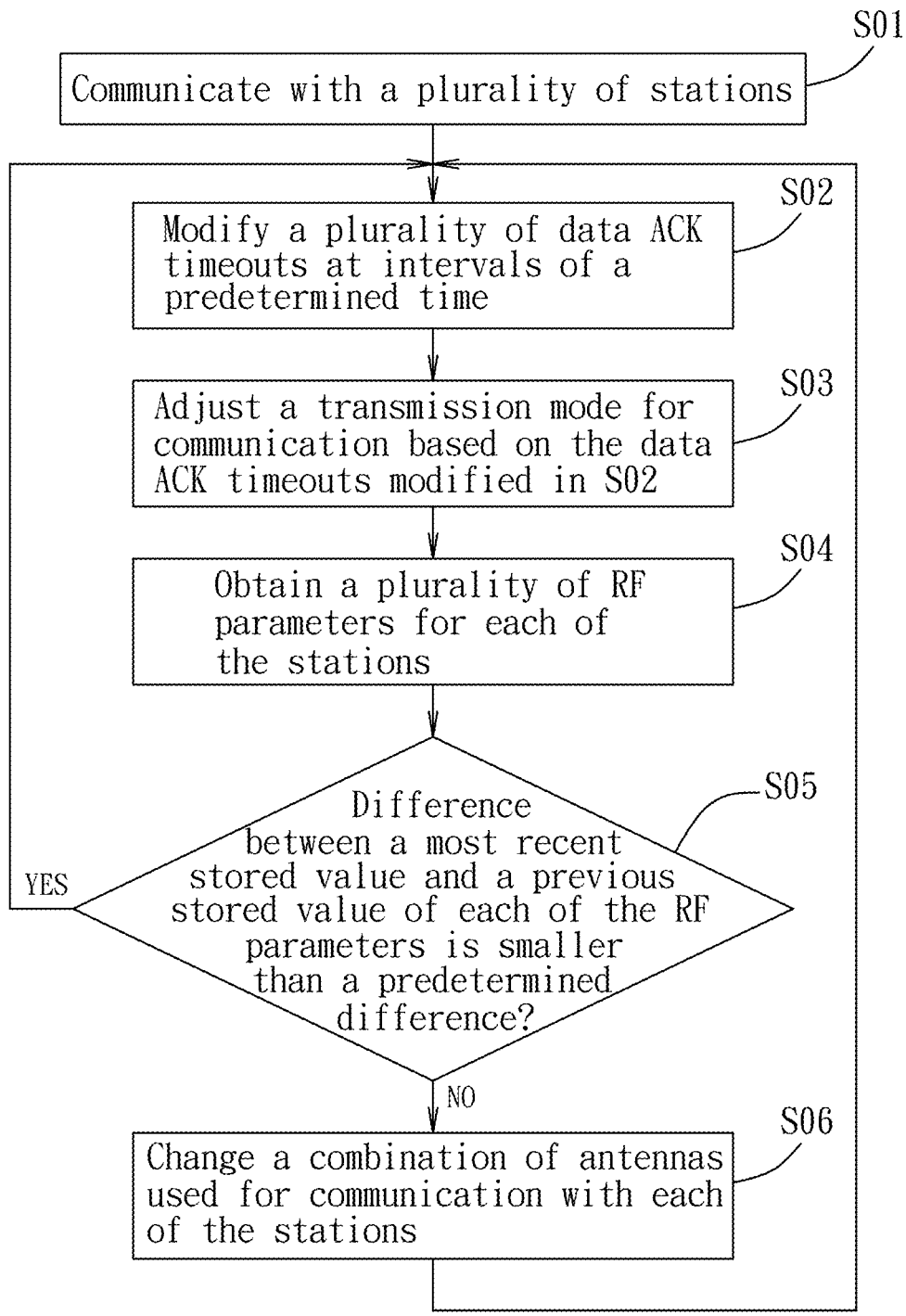
FIG. 1 is a flowchart of an embodiment of a control method of an antenna system according to the present invention.

Referring to FIG. 1, the embodiment of a control method of an antenna system according to the present invention is shown. First, in step S01, an antenna system is configured to communicate with a plurality of stations. In this embodiment, the antenna system serves as an access point (AP), and the stations (STAB) are mobile communication devices such as smart phones, tablet PCs, etc., but are not limited to these devices. The antenna system and the stations communicate wirelessly through the WiFi 802.11n protocol. Then, as shown in step S02, the antenna system is configured to modify, at intervals of a predetermined time (e.g., every 30 seconds), a plurality of data acknowledgement (ACK) timeouts which correspond respectively to the stations, so that each of the data ACK timeouts substantially equals the round trip time of a packet for communication between the antenna system and a corresponding one of the stations. The data ACK timeout is defined as a time limit for awaiting receipt of an acknowledgement (ACK) of a packet after the antenna system sent out the packet. That is to say, if the antenna system does not receive the ACK of the packet within the data ACK timeout, transmission of the previously sent packet is determined to have failed. Specifically, in step S02, for each of the stations, the antenna system continually reduces the data ACK timeout until an ACK of a packet replied from the station cannot be received after the data ACK timeout expires, and then continually increases the data ACK timeout until an ACK of a packet replied from the station can be received within the data ACK timeout, so that the data ACK timeout substantially equals the round trip time of a packet for communication between the antenna system and the station. In this way, an issue that a station is wrongly determined as being unable to communicate with the antenna system while the station is in fact covered by the antenna system due to the data ACK timeout being set too short may be prevented.

Figure 2:
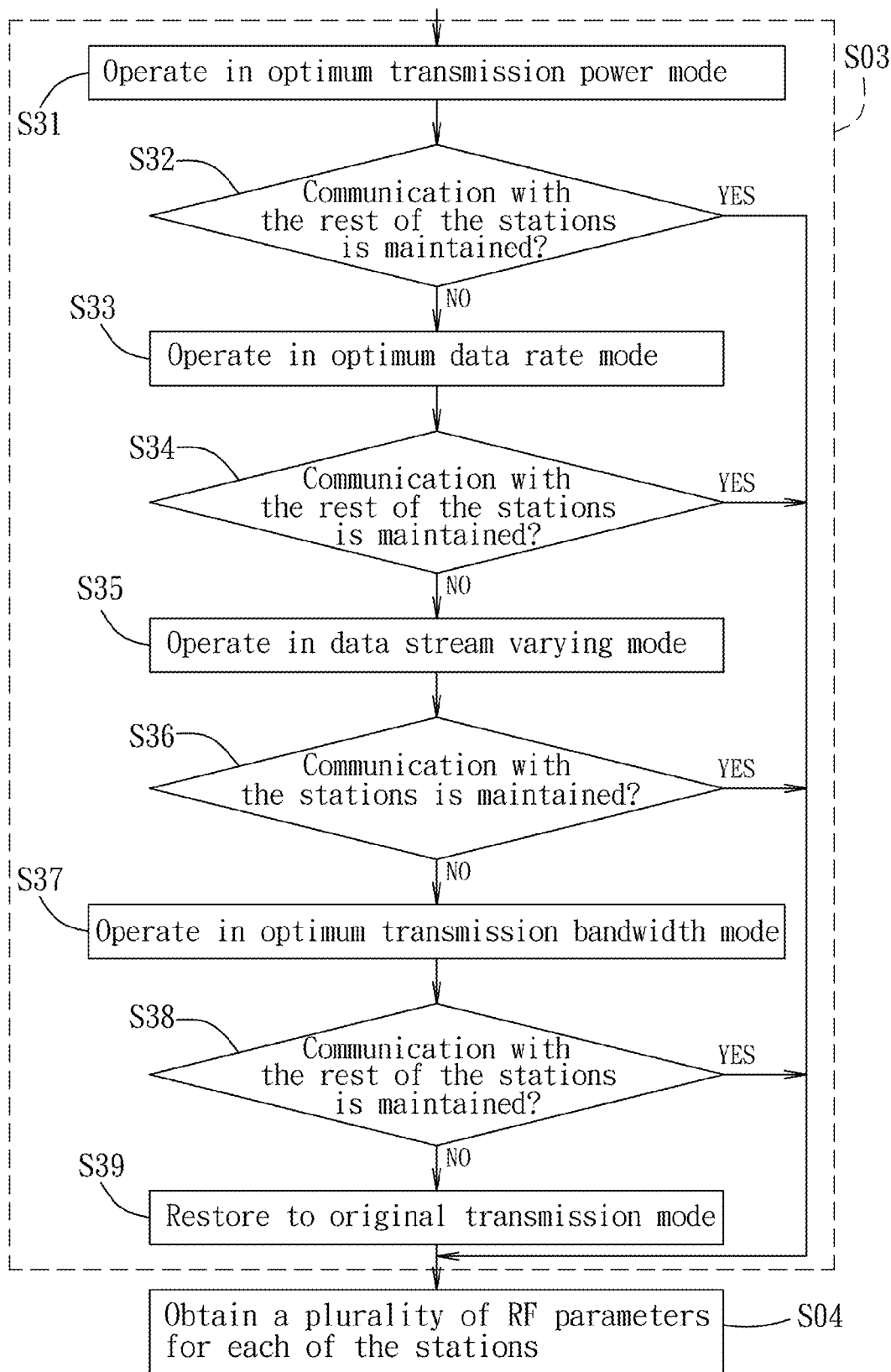
FIG. 2 is a flowchart of step S03 in the embodiment.

Subsequently, in step S03, the antenna system is configured to adjust a transmission mode for communication with the stations based on the data ACK timeouts modified in step S02. FIG. 2 shows the detailed process flows of step S03. As shown in FIG. 2, step S03 includes sub-steps S31 to S37. In sub-step S31, the antenna system is configured to switch from an original transmission mode to an optimum transmission power mode, where the antenna system communicates, by optimum transmission power, which is the maximum power the antenna system is able to provide for communication, with one of the stations having a relatively longer data ACK timeout, and reduces the transmission power for communication with the rest of the stations. Then, in sub-step S32, the antenna system is configured to determine whether the communication with the rest of the stations is maintained. In the affirmative, the flow proceeds to step S04. In the negative, the flow proceeds to sub-step S33. In sub-step S33, the antenna system is configured to restore the transmission mode from the optimum transmission power mode to the original transmission mode and then to an optimum data rate mode, where the antenna system communicates, at an optimum data rate, which is the highest data rate the antenna system is able to communicate at, with said one of the stations having the relatively longer data ACK timeout, and reduces data rates for communication with the rest of the stations. Subsequently, in sub-step S34, the antenna system is configured to determine whether the communication with the rest of the stations is maintained. In the affirmative, the flow proceeds to step S04. In the negative, the flow proceeds to sub-step S35.

In sub-step S35, the antenna system is configured to restore the transmission mode from the optimum data rate mode to the original transmission mode and then to a data stream varying mode to adjust the number of data streams, into which one packet is divided, for communicating with each of the stations in a manner that the longer the data ACK timeout one of the stations has, the smaller number of the data streams for communication with said one of the stations is allotted. Then, in sub-step S36, the antenna system is configured to determine whether the communication with all the stations is maintained. In the affirmative, the flow proceeds to step S04. In the negative, the flow proceeds to sub-step S37. In sub-step S37, the antenna system is configured to restore the transmission mode from the data stream varying mode to the original, in which settings of the number of the data streams are restored to their original states, and then to an optimum transmission bandwidth mode, where the antenna communicates, by an optimum transmission bandwidth, which is the broadest bandwidth of a channel the antenna system is able to operate in, with said one of the stations having the relatively longer data ACK timeout, and reduces the transmission bandwidths for communication with the rest of the stations. Subsequently, in sub-step S38, the antenna system is configured to determine whether the communication with the rest of the stations is maintained. In the affirmative, the flow proceeds to step S04. In the negative, the flow proceeds to sub-step S39. In sub-step S39, the antenna system is configured to restore the transmission mode from the optimum transmission bandwidth mode to the original transmission mode.

Now, the reason for adjusting the transmission mode for communication with the stations based on the data ACK timeouts modified in step S02 is illustrated as follows. In general, the round trip time of a packet is related to the distance between the antenna system and the station. When the distance between the antenna system and the station is greater, the round trip time of the packet is usually longer. On the contrary, when the distance between the antenna system and the station is smaller, the round trip time of the packet is usually shorter. Since in the present invention, the data ACK timeout is modified to be substantially equal to the round trip time of the packet, the data ACK timeout may reflect the distance between the antenna system and the station. In this sense, step S03 may realize the function of adjusting the transmission mode according to the distances between the antenna system and the stations.

Furthermore, in general, a station that is closer to the antenna system in distance will take up more transmission load (such as the transmission bandwidth) from the antenna system and achieve better transmission effect. On the other hand, the transmission between the antenna system and a more distant station is less effective. Hence, sub-steps S31, S33 and S37 are used to balance load allocation of the antenna system in order to raise the transmission loads of more distant stations, so as to improve the quality of signal transmission between the antenna system and the more distant stations.

It is worth to note that when the distance between the station and the antenna system is greater, due to interferences in the environment, it is possible that not all of the data streams of a single packet will be delivered successfully. In other words, when a station is distant from the antenna system, the more data streams one packet is divided into, the lower chance the whole packet can be received at the station. Sub-step S35 is used to reduce the numbers of the data streams corresponding to the more distant stations in order to increase the chances of successful data transmission. In addition, an order of priority of the factors considered for adjusting the transmission mode as adopted in step S03 is the transmission power, the data rate, the number of data streams and the transmission bandwidth, but it should not be limited to this disclosure.

Referring to FIG. 1, step S04 is executed after the completion of step S03. In step S04, the antenna system is configured to obtain, for each of the stations, a plurality of radio frequency (RF) parameters associated with communication with the station, and to store the RF parameters for the station. In this embodiment, the RF parameters are respectively a packet error rate (PER) parameter, a data rate parameter, a received signal strength indicator (RSSI) parameter, a data ACK timeout parameter and a transmission power (tx power) parameter. The packet error rate parameter, the data rate parameter, and the RSSI parameter may be obtained through configuring the antenna system to send a broadcast packet to the stations and to received a reply packet from the stations, and through feedback of a 802.11n WiFi driving program in the antenna system. The RF parameters may be stored in an antenna (ANT) parameter database for access and operation.

Figure 3:
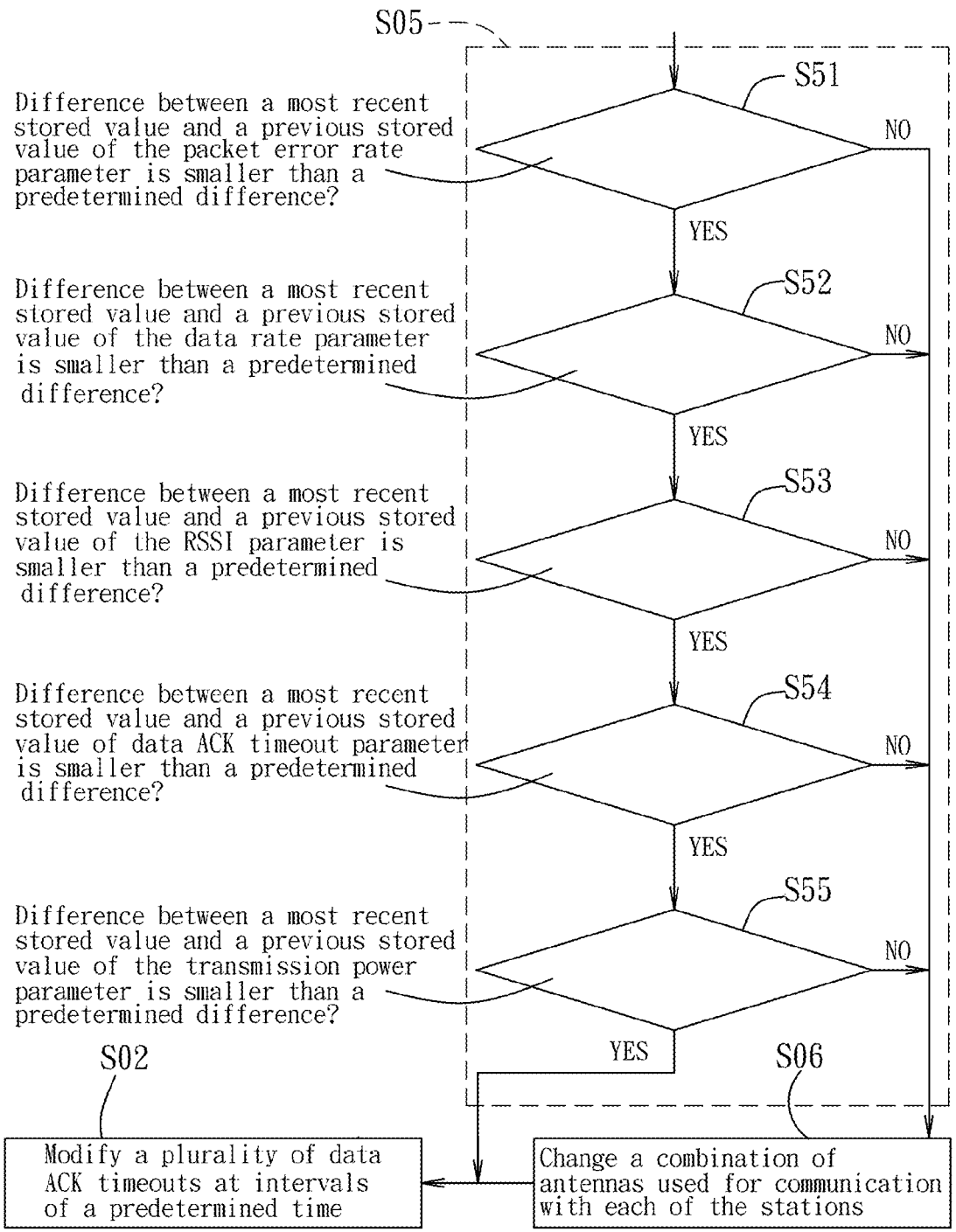
FIG. 3 is a flowchart of step S05 in the embodiment.

Next, in step S05, the antenna system is configured to determine in accordance with a predetermined parameter priority order, for each of the stations, whether a difference between a most recent stored value and a previous stored value of each of the RF parameters is smaller than a predetermined difference for a corresponding one of the RF parameters. In the negative, the flow proceeds to step S06. In this embodiment, the priority weights set in the predetermined parameter priority order are assigned from high to low as: the packet error rate parameter, the data rate parameter, the RSSI parameter, the data ACK timeout parameter and the transmission power parameter. FIG. 3 illustrates the detailed process-flow of step S05, which includes sub-steps S51 to S55. In sub-step S51, for each of the stations, the antenna system is configured to determine whether a difference between a most recent stored value and a previous stored value of the packet error rate parameter is smaller than a predetermined difference for the packet error rate parameter. In the negative, the flow proceeds to step S06, whereas in the affirmative, the flow proceeds to sub-step S52. In sub-step S52, for each of the stations, the antenna system is configured to determine whether a difference between a most recent stored value and a previous stored value of the data rate parameter is smaller than a predetermined difference for the data rate parameter. In the negative, the flow proceeds to step S06, whereas in the affirmative, the flow proceeds to sub-step S53.

In sub-step S53, for each of the stations, the antenna system is configured to determine whether a difference between a most recent stored value and a previous stored value of the RSSI parameter is smaller than a predetermined difference for the RSSI parameter. In the negative, the flow proceeds to step S06, whereas in the affirmative, the flow proceeds to sub-step S54. In sub-step S54, for each of the stations, the antenna system is configured to determine whether a difference between a most recent stored value and a previous stored value of data ACK timeout parameter is smaller than a predetermined difference for the data ACK timeout parameter. In the negative, the flow proceeds to step S06, whereas in the affirmative, the flow proceeds to sub-step S55. In sub-step S55, for each of the stations, the antenna system is configured to determine whether a difference between a most recent stored value and a previous stored value of the transmission power parameter is smaller than a predetermined difference for the transmission power parameter. In the negative, the flow proceeds to step S06, whereas in the affirmative, the flow proceeds to step S02, that is, dynamic maintenance of the antenna system is conducted at intervals of the predetermined time.

In step S06, the antenna system is configured to change a combination of a plurality of antennas of the antenna system used for communication with one of the stations, thereby using an optimum combination of antennas to communicate with said one of the stations. It is worth to note that, in step S06, for each of the stations, the antenna system is configured to divide, according to the number of the data streams corresponding to the station, the plurality of antennas of an antenna array of the antenna system into several groups, and to select at least one antenna in each of the groups for transmitting one of the data streams corresponding to the group. For example, if the antenna array of the antenna system has nine antennas, and the number of the data streams corresponding to the station is three, then in step S06, the nine antennas are divided into three groups (i.e., three antennas per group), and at least one antenna in each of the three groups is selected to transmit the respective data streams that corresponds to a respective one of the three sets of antennas. Compared with directly selecting at least three antennas from among the nine antennas, grouping the antennas in advance may effectively improve the selection efficiency. In this way, it is easier to realize the dynamic maintenance of antenna. Due to the fact that the quality of communication between the antenna system and the stations may be altered by changes in the environment, displacements of the stations, setting alterations of the antenna system, etc., the present invention utilizes the changes of the RF parameters to reflect the changes in the quality of the communication, and dynamically maintains the antenna system to use the optimum combination of antennas for communication with the stations.

Figure 4:
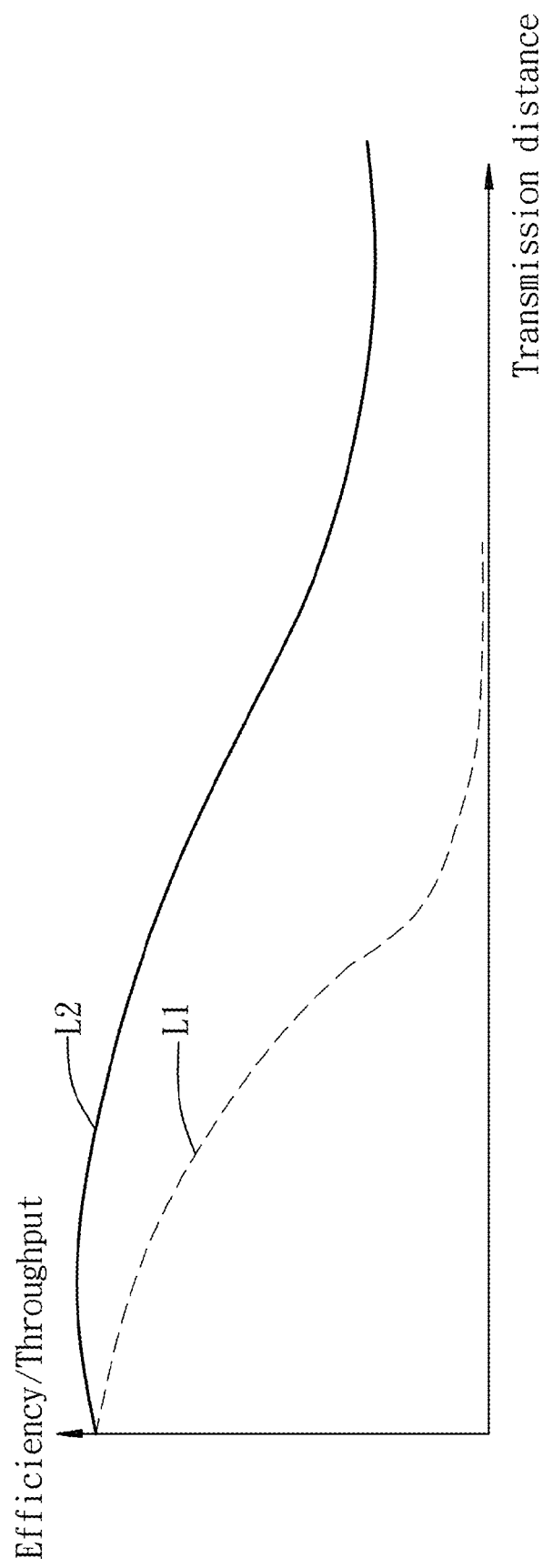
FIG. 4 shows curves of efficiency/throughput versus transmission distance for the embodiment and a conventional antenna system.

Referring to FIG. 4, a conventional antenna system has a curve L1 of efficiency/throughput versus transmission distance, and the antenna system of the present invention has a curve L2 of efficiency/throughput versus transmission distance. FIG. 4 illustrates that transmission coverage of the antenna system is effectively improved in the present invention.

In sum, the control method of an antenna system of the present invention, by means of periodical maintenance of the data ACK timeout and by means of periodical maintenance of the combination of antennas based on the RF parameters, may enhance the automatic and dynamic maintenance ability of the antenna system and may also increase the transmission coverage and anti-interference capability of the antenna system.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A control method of an antenna system comprising steps of:
   (A) configuring an antenna system to communicate with a plurality of stations;
   (B) configuring the antenna system to modify, at intervals of a predetermined time, a plurality of data acknowledgement (ACK) timeouts which correspond respectively to the stations, so that each of the data ACK timeouts equals a round trip time of a packet for communication between the antenna system and the corresponding one of the stations; and
   (C) configuring the antenna system to adjust a transmission mode for communication with the stations based on duration of the data ACK timeouts modified in the step (B).

2. The control method of an antenna system as claimed in claim 1, wherein in the step (B), for each of the stations, the antenna system continually reduces the data ACK timeout until an acknowledgement of a packet replied from the station cannot be received after the data ACK timeout expires, and then continually increases the data ACK timeout until an ACK of a packet replied from the station can be received within the data ACK timeout, so that the data ACK timeout equals the round trip time of a packet for communication between the antenna system and the station.

3. The control method of an antenna system as claimed in claim 1, wherein the step (C) includes a sub-step of:
   (C1) configuring the antenna system to operate in an optimum transmission power mode where the antenna system communicates, by optimum transmission power, with one of the stations having the longer data ACK timeout, and reduces transmission power for communication with the rest of the stations.

4. The control method of an antenna system as claimed in claim 3, wherein the step (C) further includes sub-steps of:
   (C2) configuring the antenna system to determine whether the communication with the rest of the stations is maintained; and
   (C3) when it is determined in the sub-step (C2) that the communication with the rest of the stations is not maintained, configuring the antenna system to operate in an optimum data rate mode, where the antenna system communicates, at an optimum data rate, with said one of the stations having the longer data ACK timeout, and reduces data rates for communication with the rest of the stations.

5. The control method of an antenna system as claimed in claim 4, wherein the step (C) further includes sub-steps of:
   (C4) configuring the antenna system to determine whether the communication with the rest of the stations is maintained; and
   (C5) when it is determined in the step (C4) that the communication with the rest of the stations is not maintained, configuring the antenna system to operate in a data stream varying mode, where the antenna system adjusts a number of data streams for communication with each of the stations in a manner that a longer the data ACK timeout one of the stations has, a smaller number of the data streams for communication with said one of the stations is allotted.

6. The control method of an antenna system as claimed in claim 5, wherein step (C) further includes sub-steps of:
   (C6) configuring the antenna system to determine whether the communication with the stations is maintained; and
   (C7) when it is determined in the step (C6) that the communication with the stations is not maintained, configuring the antenna system to operate in an optimum transmission bandwidth mode, where the antenna system communicates, by an optimum the transmission bandwidth, with said one of the stations having the longer data ACK timeout, and reduces the transmission bandwidths for communication with the rest of the stations.

7. The control method of an antenna system as claimed in claim 1, further comprising, after step (C), steps of:
   (D) configuring the antenna system to obtain, for each of the stations, a plurality of radio frequency (RF) parameters associated with communication with the station, and to store the RF parameters for the station;

(E) configuring the antenna system to determine in accordance with a predetermined parameter priority order, for each of the stations, whether a difference between a most recent stored value and a previous stored value of each of the RF parameters is smaller than a predetermined difference for the RF parameter; and (F) if it is determined in the step (E) that the difference between the most recent stored value and the previous stored value of each of the RF parameters is not smaller than the predetermined difference for the RF parameter for one of the stations, configuring the antenna system to change a combination of a plurality of antennas of the antenna system used for communication with said one of the stations.

8. The control method of an antenna system as claimed in claim 7, wherein a first one of the RF parameters is a packet error rate parameter, and in the predetermined parameter priority order, a priority weight of the packet error rate parameter is set to be a maximum.

9. The control method of an antenna system as claimed in claim 8, wherein a second one of the RF parameters is a data rate parameter, and in the predetermined parameter priority order, a priority weight of the data rate parameter is set to be lower than that of the packet error rate parameter.

10. The control method of an antenna system as claimed in claim 9, wherein a third one of the RF parameters is a received signal strength indicator (RSSI) parameter, and in the predetermined parameter priority order, a priority weight of the RSSI parameter is set to be lower than that of the data rate parameter.

11. The control method of an antenna system as claimed in claim 10, wherein a fourth one of the RF parameters is a data ACK timeout parameter, and in the predetermined parameter priority order, a priority weight of the data ACK timeout parameter is set to be lower than that of the RSSI parameter.

12. The control method of an antenna system as claimed in claim 11, wherein a fifth one of the RF parameters is a transmission power parameter, and in the predetermined parameter priority order, a priority weight of the transmission power parameter is set to be lower than that of the data ACK timeout parameter.

13. The control method of an antenna system as claimed in claim 7, wherein in the step (F), for each of the stations, the antenna system is configured to divide, according to a number of the data streams corresponding to the station, the plurality of antennas of the antenna system into several groups, and to select at least one antenna in each of the groups for transmitting a corresponding one of the data streams.

14. A control method of an antenna system comprising the steps of:

(a) configuring an antenna system to communicate with a first station and a second station;

(b) configuring the antenna system to modify, at intervals of a predetermined time, a first acknowledgement (ACK) timeout and a second ACK timeout which correspond respectively to the first and second stations, so that each of the first and second ACK timeouts equals a round trip time of a packet for communication between the antenna system and the respective one of the first and second stations; and (c) configuring the antenna system to adjust a transmission mode for communication with each of the first and second stations based on a duration of a respective one of the first and second ACK timeouts, the duration of the first ACK timeout being different from the duration of the second ACK timeout; and wherein each of the first and second ACK timeouts is associated with a distance between the antenna system and the respective one of the first and second stations.

15. The control method of an antenna system as claimed in claim 14, wherein the step (c) includes a sub-step of:

(c1) configuring the antenna system to operate in an optimum transmission power mode where the antenna system communicates, by optimum transmission power, with one of the first and second stations having the longer data ACK timeout, and reduces transmission power for communication with the other of the first and second stations.

16. The control method of an antenna system as claimed in claim 14, wherein the step (c) further includes a sub-step of:

(c2) configuring the antenna system to operate in an optimum data rate mode, where the antenna system communicates, at an optimum data rate, with said one of the first and second stations having the longer data ACK timeout, and reduces data rates for communication with the other of the first and second stations.

17. The control method of an antenna system as claimed in claim 14, wherein the step (c) further includes a sub-step of:

(c3) configuring the antenna system to operate in a data stream varying mode, where the antenna system adjusts a number of data streams for communication with each of the first and second stations in a manner that a longer the data ACK timeout one of the first and second stations has, a smaller number of the data streams for communication with said one of the first and second stations is allotted.

18. The control method of an antenna system as claimed in claim 14, wherein the step (c) further includes a sub-step of:

(c4) configuring the antenna system to operate in an optimum transmission bandwidth mode, where the antenna system communicates, by an optimum transmission bandwidth, with said one of the first and second stations having the longer data ACK timeout, and reduces transmission bandwidths for communication with the other of the first and second stations.

* * * * *